US012772411B2

United States Patent

Jiang et al.

(12) United States Patent
(10) Patent No.: US 12,772,411 B2
(45) Date of Patent: Oct. 20, 2026

(54) RADIATOR OF VEHICLE POWER MODULE AND DESIGN METHOD THEREOF

(71) Applicants: Nexperia Technology (Shanghai) Ltd., Shanghai (CN); Chongqing University, Chongqing (CN); NEXPERIA B.V., Nijmegen (NL)

(72) Inventors: Ke Jiang, Shanghai (CN); Zheng Zeng, Shanghai (CN); Chunlin Zhu, Shanghai (CN); Jiawei Zhang, Shanghai (CN); Richard Qian, Shanghai (CN); Peng Sun, Shanghai (CN); Minhui Ma, Shanghai (CN); Yuxi Liang, Shanghai (CN)

(73) Assignees: Nexperia Technology (Shanghai) Ltd., Shanghai (CN); Chongqing University, Chongqing (CN); Nexperia BV, Nijmegen (NL)

( * ) Notice: Subject to any disclaimer, the term of this patent is extended or adjusted under 35 U.S.C. 154(b) by 813 days.

(21) Appl. No.: 18/296,451

(22) Filed: Apr. 6, 2023

(65) Prior Publication Data

US 2023/0328935 A1 Oct. 12, 2023

(30) Foreign Application Priority Data

Apr. 7, 2022 (CN) ......................... 202210363997.1

(51) Int. Cl.
*H05K 7/20* (2006.01)
*G06F 30/17* (2020.01)
(Continued)

(52) U.S. Cl.
CPC ......... *H05K 7/20254* (2013.01); *G06F 30/17* (2020.01); *G06F 30/23* (2020.01);
(Continued)

(58) Field of Classification Search
CPC ........ F28F 9/0246; G06F 30/15; G06F 30/17; G06F 30/23; G06F 30/28; G06F 2113/08;
(Continued)

(56) References Cited

U.S. PATENT DOCUMENTS 5,083,194 A * 1/1992 Bartilson .............. H10W 40/43 257/722
5,726,495 A * 3/1998 Aihara .................. H10W 90/00 428/614

(Continued)

FOREIGN PATENT DOCUMENTS

CN 101504689 B * 4/2010

OTHER PUBLICATIONS

Machine translation of CN 101504689 (Year: 2026).*

*Primary Examiner* — Eric S Ruppert
*Assistant Examiner* — Hans R Weiland
(74) *Attorney, Agent, or Firm* — Ruggiero McAllister & McMahon LLC

(57) ABSTRACT

This disclosure provides a design method for a radiator of a vehicle power module. The design method includes: selecting a plurality of specific values from the possible value ranges of the first distance D1, the second distance D2 and the radius R, respectively, to form different combinations of the plurality of specific values, performing simulation calculations on the different combinations, and obtaining a temperature rise ΔTj and a pressure drop ΔPf corresponding to each combination to form a plurality of samples; through a response surface method, fitting explicit functions of the temperature rise ΔTj and the pressure drop ΔPf with the first distance D1, the second distance D2 and the radius R as dependent variables; and through a multi-objective optimization, determining the first distance D1, the second distance D2 and the radius R with an optimization objective that the (Continued)

temperature rise ΔTj and the pressure drop ΔPf are simultaneously minimized.

18 Claims, 13 Drawing Sheets

(51) Int. Cl.
*G06F 30/23* (2020.01)
*G06F 30/28* (2020.01)
*H10W 40/47* (2026.01)
*G06F 111/06* (2020.01)

(52) U.S. Cl.
CPC ......... *G06F 30/28* (2020.01); *H05K 7/20927* (2013.01); *H10W 40/47* (2026.01); *G06F 2111/06* (2020.01)

(58) Field of Classification Search
CPC ............. G06F 2111/06; G06F 2119/08; H05K 7/20218; H05K 7/20254; H05K 7/20272; H05K 7/20281; H05K 7/209; H05K 7/20927
See application file for complete search history.

(56) References Cited

U.S. PATENT DOCUMENTS

2006/0231237 A1* 10/2006 Dangelo ............... H10W 40/47 165/104.34
2014/0262177 A1* 9/2014 Tang ..................... H10W 40/47 165/169
2020/0404804 A1* 12/2020 Stoltz ................. H05K 7/20254
2023/0152047 A1* 5/2023 Zhou ......................... F28F 3/12 165/104.19

* cited by examiner

RADIATOR OF VEHICLE POWER MODULE AND DESIGN METHOD THEREOF

CROSS-REFERENCE TO RELATED APPLICATIONS

This application claims the benefit under 35 U.S.C. § 119(a) of Chinese Application No. 202210363997.1 filed Apr. 7, 2022, the contents of which are incorporated by reference herein in their entirety.

BACKGROUND

1. Field of the Disclosure

This disclosure is related to the field of electronic devices, and particularly a radiator of a vehicle power module, and a design method thereof.

2. Description of the related art

In an electric vehicle, a motor controller converts electric energy stored in a battery to electric energy required for driving a motor to drive and control the electric vehicle according to operating instructions. The motor controller is one of the key parts of the electric vehicle as a bond for connecting the power battery and the motor.

The vehicle power module is an important component in the motor controller. At present, the integration level of the vehicle power module is increasingly high, and the heat flux of the power chip is increasingly large, causing more and more severe challenge for the thermal management of the vehicle power module.

In recent years, the cooling method of the vehicle power module gradually develops from the conventional finned air cooling heat dissipation and water cooling plate heat dissipation (as shown in FIG. 1*a*) to the liquid cooling heat dissipation with a plurality of pillars integrated therein (as shown in FIG. 1*b*).

The research on the optimization design of the radiator with a plurality of pillars integrated therein mainly focuses on two aspects of the morphology structure and the array arrangement (as shown in FIG. 2) of the pillars. At present, circular pillars are used more frequently due to the advantage of compromise between cost and properties. In terms of the array arrangement of the pillars, if a denser arrangement is used, although the heat exchange capacity of the radiator could be increased to a certain extent, the excessively dense arrangement would prevent the cooling liquid from flowing among the pillars, increasing flow channel resistance and the pressure drop of the cooling liquid of the radiator. Therefore, the array arrangement of the pillars needs to be reasonably optimized.

Regarding the design of the array arrangement of the pillars, the empirical trial-and-error method is mostly used, in combination with methods such as empirical enumeration, permutation and combination. A large number of pillar arrangement modes are generated, then the temperature characteristics thereof are obtained through simulation or experiment, and finally an optimized scheme is screened from these pillar arrangement modes. Such a design method lacks methodology guidance, and tests and trial-and-error are required with long design period and high cost, making it difficult to realize the optimal design.

SUMMARY

This disclosure provides a design method for a radiator of a vehicle power module, wherein the radiator comprises:

a heat dissipation substrate having a first surface in proximity to the vehicle power module, and a second surface distant from the vehicle power module; and a cooling tank, which is located on a side of the second surface distant from the vehicle power module, wherein the cooling tank is provided with an interface in proximity to the second surface, and the second surface seals the interface, a side wall of the cooling tank is provided with a liquid inlet for an inflow of a cooling liquid and a liquid outlet for an outflow of the cooling liquid, the heat dissipation substrate is provided with a plurality of pillars extending from the second surface, the plurality of pillars extends into the cooling tank through the interface;

the plurality of pillars form a pillar array, the pillar array comprises a plurality of rows, the pillars in a same row are arranged on a same straight line, and a distance between two adjacent pillars in the same row is a first distance D1, the plurality of rows are parallel to each other, a distance between two adjacent rows is a second distance D2, the plurality of pillars are cylindrical and have a radius R, wherein the design method comprises the following steps:

determining possible value ranges of the first distance D1, the second distance D2 and the radius R;

selecting a plurality of specific values from the possible value ranges of the first distance D1, the second distance D2 and the radius R, respectively, to form different combinations of the plurality of specific values, performing simulation calculations on the different combinations, and obtaining a temperature rise $\Delta Tj$ and a pressure drop $\Delta Pf$ corresponding to each combination to form a plurality of samples, wherein the temperature rise $\Delta Tj$ is a difference between a temperature of the cooling liquid flowing through the liquid inlet and a temperature of a chip in the vehicle power module when the simulation calculations are performed for the different combinations, and the pressure drop $\Delta Pf$ is a difference between a pressure of the cooling liquid flowing through the liquid inlet and a pressure of the cooling liquid flowing through the liquid outlet when the simulation calculations are performed for the different combinations;

according to the plurality of samples, through a response surface method, fitting explicit functions of the temperature rise $\Delta Tj$ and the pressure drop $\Delta Pf$ with the first distance D1, the second distance D2 and the radius R as dependent variables; and through a multi-objective optimization, determining the first distance D1, the second distance D2 and the radius R with an optimization objective that the temperature rise $\Delta Tj$ and the pressure drop $\Delta Pf$ are simultaneously minimized.

According to the above design method of this disclosure, based on the response surface method, the existing empirical trial-and-error method is abandoned, the design speed of the radiator could be increased, and the development cycle and cost could be reduced.

Optionally, the radius R is expressed by a radius ratio $R_{per}$, and the relationship between the radius R and the radius ratio $R_{per}$ is:

$$R = R_{per} \times \min\left(\sqrt{D_1^2/4 + D_2^2}/2,\ D_1/2\right),$$

where min $$\left(\sqrt{D_1^2/4 + D_2^2}/2,\ D_1/2\right)$$

expresses a smaller value between $$\sqrt{D_1^2/4 + D_2^2}/2$$

Expressing the radius R by the radius ratio $R_{per}$ could easily expand the design domain.

Optionally, performing simulation calculations on the different combinations is implemented by finite element simulation. The accuracy of the finite element simulation is high, which could ensure the stability of the design results.

Optionally, an equivalent thin thermal resistance layer is set between the heat dissipation substrate and the plurality of pillars, the equivalent thin thermal resistance layer has a same thermal conductivity coefficient as that of a thermal conductive interface material. Setting the equivalent thin thermal resistance layer between the heat dissipation substrate and the plurality of pillars could correspond to the actual situation in the subsequent verification experiments, and could ensure the accuracy of the simulation calculations.

Optionally, the thermal conductive interface material is set to be silicone grease. Setting silicone grease between the heat dissipation substrate and the plurality of pillars could correspond to the actual situation in the subsequent verification experiments.

Optionally, the vehicle power module comprises a circuit board and the chip, the chip is disposed on the circuit board, a material of the circuit board is set to be copper, a material of the power chip is set to be silicon, and a material of the heat dissipation substrate and the plurality of the pillars is set to be aluminum alloy. The above settings could ensure that the simulation calculations are closer to the real product.

Optionally, the cooling liquid is set to be an ethanol solution with a volume fraction of 50%. The above setting could ensure that the simulation calculations are closer to the real product.

Optionally, the finite element simulation is performed using COMSOL Multiphysics software, with the number of grids being greater than $1.5\times10^6$. When the number of grids is increased to $1.5\times10^6$, the effect of the grids on the results is less than 0.02° C., and the effect of the grids on the simulation results could be excluded.

Optionally, the plurality of pillars have a height H, the design method further comprises performing univariate impact analysis on the first distance D1, the second distance D2, the radius R, and the height H, respectively. According to the results of the univariate impact analysis, the parameters to be designed are selected, and the possible value ranges of the parameters are determined according to the extremum states, which could ensure the accuracy of the parameters and the value ranges thereof, and reduce useless calculations.

Optionally, parameters of the plurality of pillars of any existing radiator product are identified as initial parameters of the first distance D1, the second distance D2, the radius R and the height H, the initial parameters fluctuate by a preset ratio to obtain parameter ranges of the first distance D1, the second distance D2, the radius R and the height H when performing the univariate impact analysis. Based on the initial parameters, only the value of one variable is changed within the parameter range of this variable each time, and simulation calculations on the temperature rise ΔTj and the pressure drop ΔPf are performed. The above is the preferred embodiment of the univariate impact analysis. Since the established parameter values of the existing product are closer to the optimal state, starting from the existing product for analysis could quickly obtain the analysis results and reduce the design cycle.

Optionally, in the process of performing the univariate impact analysis, values of the first distance D1, the second distance D2, the radius R, and the height H when the temperature rise ΔTj and the pressure drop ΔPf are extremums, are taken as the specific values. The extremum state is closer to the optimal state, determining the specific values according to the extremum states could ensure that subsequent calculations are performed near the ideal values.

Optionally, in the process of performing the univariate impact analysis, values of the first distance D1, the second distance D2, the radius R, and the height H, which are fluctuated by a preset ratio from values of the first distance D1, the second distance D2, the radius R, and the height H when the temperature rise ΔTj and the pressure drop ΔPf are extremums, are taken as the specific values. The extremum state is closer to the optimal state, determining the specific values near the extremum states could ensure that subsequent calculations are performed near the ideal values.

Optionally, the response surface is constructed using a central composite design method. The central composite design method has higher design accuracy considering the condition of limit design values.

Optionally, the explicit functions are fitted using a Cubic model. The design experience shows that each variance value with the Cubic model is the highest, which could provide better fitting effect on the response surface.

Optionally, the explicit functions are fitted by using a 2FI model, a Quadratic model and a Cubic model are respectively performed, variance analyses are performed on fitting results, respectively, and the fitting result with a highest variance value is taken as a final explicit function. The 2FI model, the Quadratic model and the Cubic model are currently commonly used models. The higher the variance value is, the better the fitting result is.

Optionally, the first distance D1, the second distance D2, and the radius R are determined using a nonlinear multi-objective optimization method which is high in accuracy.

In another aspect, this disclosure further provides a radiator of a vehicle power module designed according to the above-described design method.

Optionally, the first distance D1 is 3.82 mm, the second distance D2 is 2 mm, and the radius ratio $R_{per}$ is 65.5%. The above values are the preferred results determined according to the design method of this disclosure, which are suitable for the current mainstream radiators.

BRIEF DESCRIPTION OF THE DRAWINGS

The accompanying drawings, which are included to provide further understanding of the disclosed embodiments and constitute a part of this specification, serve to explain this disclosure together with the disclosed embodiments, not to limit this disclosure. The above and other features and advantages will become more apparent to a person skilled in the art by describing the detailed exemplary embodiments with reference to the accompanying drawings, in the drawings:

FIGS. 6*a* to 6*d* show simulation calculation results of univariate impact, wherein FIG. 6*a* shows the effect of a radius ratio $R_{per}$; FIG. 6*b* shows the effect of a first distance D1; FIG. 6*c* shows the effect of a second distance D2; FIG. 6*d* shows the effect of a height H.

FIG. 7*a* is a diagram of a comparison between the temperature rises ΔTj; FIG. 7*b* is a diagram of a comparison between the pressure drops ΔPf.

FIGS. 8*a* to 8*d* show a response surface according to an embodiment of this disclosure, wherein FIG. 8*a* shows a functional relationship between a pressure drop and D2 and D1; FIG. 8*b* shows a functional relationship between the pressure drop and $R_{per}$ and D1; FIG. 8*c* shows a functional relationship between the pressure drop and D2 and D1; FIG. 8*d* shows a functional relationship between the pressure drop and $R_{per}$ and D1.

FIGS. 12*a* and 12*b* are diagrams illustrating a comparison of properties between a conventional radiator and an optimized radiator according to an embodiment of this disclosure, wherein FIG. 12*a* shows changes of the temperature rise with DC voltage; FIG. 12*b* shows changes of the temperature rise with load current.

FIGS. 13*a* and 13*b* are diagrams illustrating a comparison of properties between a conventional radiator and an optimized radiator according to an embodiment of this disclosure, wherein FIG. 13*a* shows the effect of a cooling liquid flow on a thermal resistance of the radiator; FIG. 13*b* shows the effect of the cooling liquid flow on a pressure drop of the radiator.

DETAILED DESCRIPTION

In order for a person skilled in the art to better understand the technical solutions of this disclosure, this disclosure will be described in detail below in conjunction with the accompanying drawings and an embodiment.

Structure of the Radiator

Figure 1A:
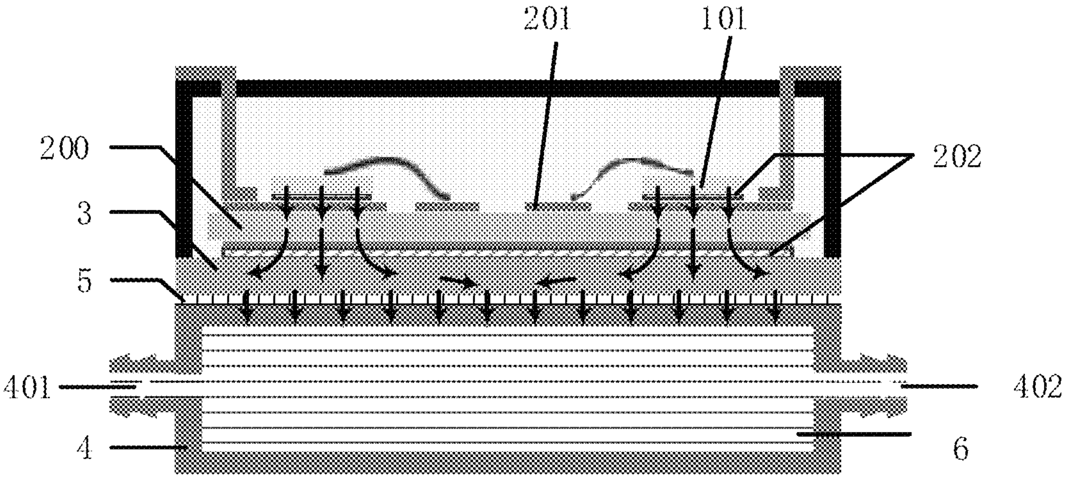
FIG. 1*a* is a schematic view of a prior art structure of a water cooling plate radiator.

A water cooling plate radiator of the prior art is shown in FIG. 1*a*. A power chip 101 is disposed on a Direct Bonded Copper (DBC) 200, copper layers 201 are laid on both surfaces of the DBC 200, and the power chip 101 is mounted to the copper layer 201 on one surface of the DBC 200 by solder 202. The DBC 200 is mounted to the substrate 3 by solder 202. Since the DBC 200 could not be subjected to a force, the substrate 3 functions as a bearing plate. A water cooling plate 4 is disposed below the substrate 3, and a Thermal Interface Material (TIM) 5 is sandwiched between the substrate 3 and the water cooling plate 4. The side wall of the water cooling plate 4 is provided with a liquid inlet 401 for an inflow of a cooling liquid and a liquid outlet 402 for an outflow of the cooling liquid, and the cooling liquid 6 flows between the liquid inlet 401 and the liquid outlet 402 of the water cooling plate 4 to remove the heat conducted from the power chip 101. The cooling liquid is typically a ethanol aqueous solution.

Figure 1B:
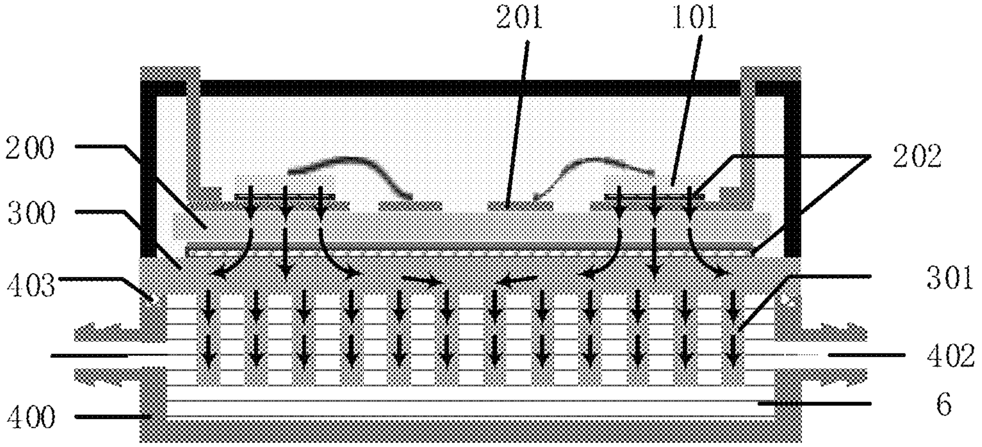
FIG. 1*b* is a schematic view of a structure of a liquid cooling radiator with a plurality of pillars integrated therein according to an embodiment of this disclosure.

With the higher integration level of the vehicle power module and the larger heat flux of the power chip 101, the water cooling plate radiator described above gradually develops into a liquid cooling radiator with a plurality of pillars 301 integrated therein, as shown in FIG. 1*b*. The power chip 101 is disposed on the DBC 200, copper layers 201 are laid on both surfaces of the DBC 200, and the power chip 101 is mounted to the copper layer 201 on one surface of the DBC 200 by solder 202. The DBC 200 is mounted to a first surface of the heat dissipation substrate 300 by solder 202. In addition to the heat dissipation effect described in detail later, the heat dissipation substrate 3 also serves to carry the DBC 200. The heat dissipation substrate 300 further has a second surface distant from the power chip 101, unlike the water cooling plate radiator of the prior art, the heat dissipation substrate 300 is provided with a plurality of pillars 301 extending from the second surface.

As shown in FIG. 1*b*, the liquid cooling radiator with a plurality of pillars integrated therein further comprises a cooling tank 400. The cooling tank 400 is located on the side of the second surface of the heat dissipation substrate 300 distant from the power chip 101. The cooling tank 400 is provided with an interface in proximity to the second surface of the heat dissipation substrate 300, and the second surface of the heat dissipation substrate 300 seals the interface. As can be seen from FIG. 1*b*, a sealing ring 403 is provided between the interface of the cooling tank 400 and the second surface of the heat dissipation substrate 300, and the sealing ring 403 serves to seal the interface of the cooling tank 400 so that the cooling liquid 6 does not leak from the interface of the cooling tank 400. The side wall of the cooling tank 400 is provided with a liquid inlet 401 for an inflow of the cooling liquid and a liquid outlet 402 for an outflow of the cooling liquid, and the cooling liquid 6 flows between the liquid inlet 401 and the liquid outlet 402 of the cooling tank to remove the heat conducted from the power chip 101. The plurality of pillars 301 extending from the second surface extend into the cooling tank 400 through the interface of the cooling tank 400, and the cooling liquid 6 passes through the plurality of pillars 301 during flow.

Figure 2:
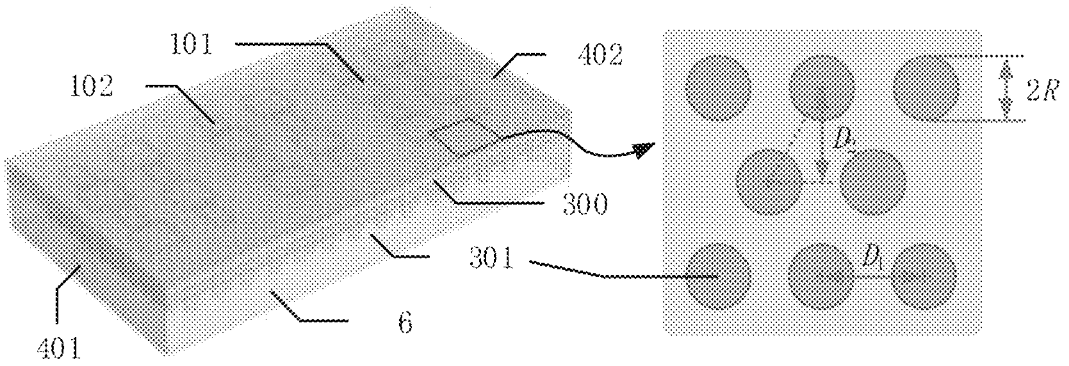
FIG. 2 is a schematic view illustrating an array arrangement of the plurality of pillars.

FIG. 2 is a schematic diagram showing an array arrangement of the plurality of pillars. The left side of FIG. 2 shows a perspective view of the liquid cooling radiator according to this disclosure, and the right side of FIG. 2 is an enlarged view of the block area in the left side. As shown in FIG. 2, in addition to the power chip 101 disposed on the DBC 200, a diode chip 102 is further disposed on the DBC 200. The plurality of pillars 301 form a pillar array. The pillar array comprises a plurality of rows, the pillars in a same row are arranged on a same straight line, and a distance between two adjacent pillars in the same row is a first distance D1. The plurality of rows are parallel to each other, a distance between two adjacent rows is a second distance D2, the plurality of pillars are cylindrical and have a radius R. Further, the plurality of pillars 301 have a height H.

The value range of the radius R is limited by the first distance D1 and the second distance D2. In order to avoid interference between the plurality of pillars 301, the radius R needs to be less than or equal to min $$\min\left(\sqrt{D_1^2/4+D_2^2}/2,\ D_1/2\right),$$

where min $$\min\left(\sqrt{D_1^2/4+D_2^2}/2,\ D_1/2\right)$$

expresses a smaller value between $$\sqrt{D_1^2/4+D_2^2}/2$$

and $D_1/2$. As shown in FIG. 2, $D_1/2$ is half of the first distance, and $$\sqrt{D_1^2/4+D_2^2}/2$$

is the distance between two adjacent pillars 301 in different rows. The radius R is less than or equal to the smaller value between $D_1/2$ and $$\sqrt{D_1^2/4+D_2^2}/2,$$

which could ensure that any two adjacent pillars 301 will not interfere with each other.

In the design method of this disclosure, the radius R is expressed by the radius ratio $R_{per}$. The relationship between radius R and radius ratio $R_{per}$ is $$R = R_{per}\times\min\left(\sqrt{D_1^2/4+D_2^2}/2,\ D_1/2\right),$$

where min $$\min\left(\sqrt{D_1^2/4+D_2^2}/2,\ D_1/2\right)$$

expresses a smaller value between $$\sqrt{D_1^2/4+D_2^2}/2$$

and $D_1/2$. In the design method of this disclosure, the design range of the radius ratio $R_{per}$ is from 0% to 100%. In other words, the design range of the radius ratio $R_{per}$ covers the entire allowable range of the radius R.

Figure 3:
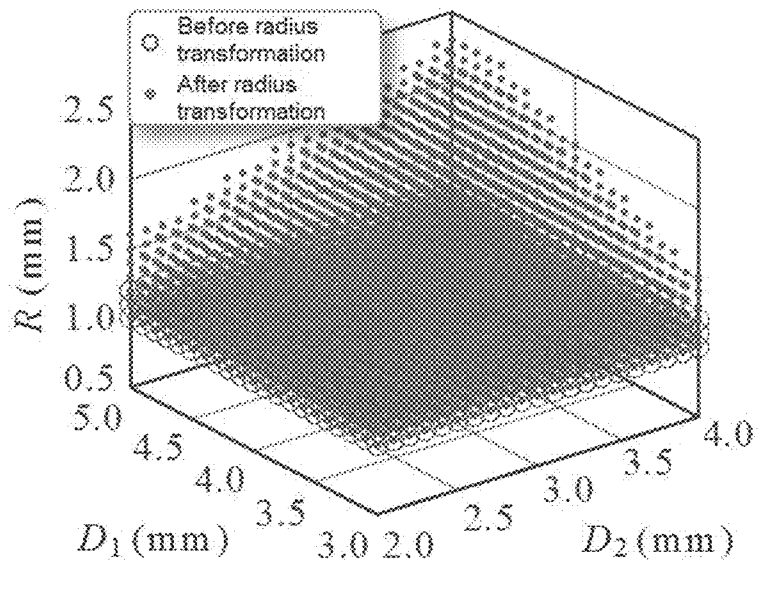
FIG. 3 is a diagram of a comparison between a design domain of a radius ratio $R_{per}$ in an embodiment of this disclosure and a design domain of a radius R of the prior art.

Expressing the radius R by the radius ratio $R_{per}$ could easily expand the design domain. As shown in FIG. 3, the design domain using the radius ratio $R_{per}$ after transformation is 1.69 times larger than the design domain of the radius R before transformation, and could cover the entire allowable range of the radius R.

Mathematical Model of the Thermal Conduction Process

The thermal conduction process of the radiator of the vehicle power module has complete mathematical description. The mathematical model will be specifically described below.

According to the heat transfer theory, the junction temperature $T_j$ of the power chip 101 could be expressed as:

$$T_j = P_{loss}R_{thjf} + T_a \tag{1}$$

Where $P_{loss}$ is the loss of the power chip 101, $T_a$ is the temperature of the cooling liquid 6 when flowing through the liquid inlet 401, and $R_{thjf}$ is the junction to flow thermal resistance from the power chip 101 to the cooling liquid 6.

For the water cooling plate radiator as shown in FIG. 1*a*, the junction to flow thermal resistance $R_{thjf}$ is expressed as:

$$R_{thjf} = R_{thjc} + R_{TIM} + R_{thhs} \tag{2}$$

Where $R_{thjc}$ is the thermal resistance from the power chip 101 to the substrate 3, $R_{thTIM}$ is the thermal resistance of the thermal conductive interface material 5, and $R_{thhs}$ is the thermal resistance of the water cooling plate 4.

For the liquid cooling radiator with a plurality of pillars 301 integrated therein as shown in FIG. 1*b*, the junction to flow thermal resistance $R_{thjf}$ is expressed as:

$$R_{thjf} = R_{thjc} + R_{thpf} \tag{3}$$

Where $R_{thjc}$ is the thermal resistance from the power chip 101 to the heat dissipation substrate 300, and $R_{thpf}$ is the thermal resistance between the plurality of pillars 301 and the cooling liquid 6. Therefore, use of the liquid cooling radiator with a plurality of pillars 301 integrated therein could eliminate the thermal resistance of the thermal conductive interface material 5, and could increase the heat exchange area between the cooling liquid 6 and the plurality of pillars 301, and could reduce the junction to flow thermal resistance of the power module.

In the electricity-heat-flow multi-physics coupling analysis, the Reynolds number $R_e$ of the fluid needs to be calculated first so as to determine the optimal fluid calculation model, $R_e$ could be expressed as:

$$R_e = \rho v D_h/\mu \tag{4}$$

Where ρ is the density of the cooling liquid 6, v is the velocity of the cooling liquid 6, $D_h$ is the characteristic length, i.e. the diameter of the cooling liquid flow at the liquid inlet 401, and μ is the kinetic viscosity of the cooling liquid 6.

The coolant of the inverter for a vehicle is generally ethanol antifreeze solution. Different proportions or coolants of other materials such as coolant oil could be used according to different specific operating environments and radiator properties. In an embodiment according to this disclosure, an ethanol solution with a volume fraction of 50% is used as the cooling liquid 6, the diameter of the liquid inlet 401 is set to be 8 mm, the temperature of the cooling liquid 6 at the liquid inlet 401 is set to be 65° C., and the flow rate of the cooling liquid 6 at the liquid inlet 401 is set to be 1 m/s. The density ρ=1.071 kg/L of the cooling liquid 6, the velocity v=1 m/s of the cooling liquid 6, the characteristic length $D_h$=8 mm, and the kinetic viscosity $\mu=1.19\times10^{-3}$Pa·s of the cooling liquid 6 are then substituted in the equation to calculate $R_e$, the calculated Reynolds number is $R_e\approx7200$, indicating that the motion form of the cooling liquid 6 is a complete turbulence. In addition, in the liquid cooling radiator with a plurality of pillars 301 integrated therein, the arrangement of the pillars 301 increases the interaction between fluid turbulent flows, the radial flow effect of the fluid is enhanced, which requires using a turbulence model for calculation.

Among various turbulence models, k-ε turbulence model is more accurate in calculating the external fluid flow with a complex structure, and simultaneously has higher convergence and lower memory requirement. Thus, this disclosure preferably uses the k-ε turbulence model to describe the kinetic behavior of the fluid in the radiator.

The k-ε turbulence model introduces two transmission equations and two turbulence variables. In the turbulence model, the cooling liquid 6 satisfies the turbulence kinetic energy equation $$\rho\frac{\partial k}{\partial t}+\rho v\cdot\nabla k=\nabla\cdot\left[\left(\mu+\frac{\mu_T}{\sigma_k}\right)\nabla k\right]+P_k-\rho\varepsilon \tag{5}$$
$$P_k=\mu_T\left[\nabla v:\left(\nabla v+\nabla v^T\right)-2(\nabla\cdot v)^2/3\right]-2\rho k\nabla\cdot v/3$$
$$\mu_T=\rho C_\mu\frac{k^2}{\varepsilon}$$

Where k is the turbulence kinetic energy, ε is the turbulence dissipation rate, v is the velocity field, $P_k$ is the turbulence production, $\mu_T$ is the turbulent dissipation, and the constants $C_\mu$ and $\sigma_k$ are 0.09 and 1.0, respectively. Considering the dissipation effect between the turbulences, the cooling liquid 6 should also satisfy the turbulence kinetic energy dissipation equation:

$$\rho\frac{\partial\varepsilon}{\partial t}+\rho v\cdot\nabla\varepsilon=\nabla\left[\left(\mu+\frac{\mu_T}{\sigma_\varepsilon}\right)\nabla\varepsilon\right]+C_{\varepsilon1}\frac{\varepsilon}{k}P_k-\rho C_{\varepsilon2}\frac{\varepsilon^2}{k} \tag{6}$$

Where the closed coefficients $\sigma_\varepsilon$, $C_{\varepsilon1}$ and $C_{\varepsilon2}$ are used to form a solution model for the closed equations, $\sigma_\varepsilon$=1.3, $C_{\varepsilon1}$=1.44 and $C_{\varepsilon2}$=1.92, respectively.

Furthermore, the cooling liquid 6 in the cooling tank 400 has continuity with a mass gradient of 0, which is expressed as:

$$\nabla\cdot(\rho v)=0 \tag{7}$$

The cooling liquid 6 in the cooling tank 400 is also incompressible, and the cooling liquid 6 at the liquid inlet 401 and the liquid outlet 402 satisfies the conservation of momentum, i.e.

$$\rho(v\cdot\nabla)v=-\nabla P+\mu\left(\nabla v+\nabla v^T\right) \tag{8}$$

Where P is the fluid pressure.

At the same time, the cooling liquid 6 also satisfies the energy conservation, i.e.

$$\rho C_P(v\cdot\nabla T)=-\mu\left(\nabla v+\nabla v^T\right):\nabla v-\nabla\cdot q \tag{9}$$

Where ":" expresses the double dot product operation of the matrix, $C_P$ is the specific heat capacity, and q is the heat.

The solid materials of the cooling tank 400 and the heat dissipation substrate 300, etc. satisfy energy conservation, i.e.

$$\nabla^2 T_s=0 \tag{10}$$

Where $T_s$ is the temperature of the solid materials.

It can be seen that there is a complete mathematical description of the thermal conduction process for the radiator with a plurality of pillars 301 integrated therein. However, the turbulence equation and the heat transfer equation are all implicit equations, using the finite element method or the finite volume method to directly solve these equations is still a huge challenge, violent search or heuristic algorithm faces a large number of repeated calculations, has high calculation complexity, has very large time and memory consumption, which makes it difficult to solve the equations.

Design Method Based on the Response Surface Method

This disclosure uses the response surface method to convert a high-dimensional and implicit finite element model into an explicit model in a low-dimensional space, characterizing the basic properties of the radiator with a plurality of pillars integrated therein and reducing the design difficulty.

The so-called response surface method means performing the sampling test on the designs in the feasible region, and performing model fitting on the dependent variables in the test range by using the experimental results to obtain the explicit function between the dependent variable Y and each design variable $x_n$ $$Y=F(x_1,x_2,\cdots,x_n) \tag{11}$$

The extremum of the explicit function is solved so as to indirectly solve the complicated optimization problem of the high-dimensional space.

Specifically, the design method according to this disclosure comprises the following steps:

determining the parameter ranges of the first distance D1, the second distance D2, the radius R and the height H;

performing univariate impact analysis on the first distance D1, the second distance D2, the radius R, and the height H, respectively;

determining the specific values of the first distance D1, the second distance D2, the radius R and the height H according to the result of univariate impact analysis;

performing different combinations on the plurality of specific values, and performing simulation calculations on the different combinations to form a plurality of samples; according to the plurality of samples, through a response surface method, fitting explicit functions;

through a multi-objective optimization, determining the first distance D1, the second distance D2 and the radius R.

Figure 4:
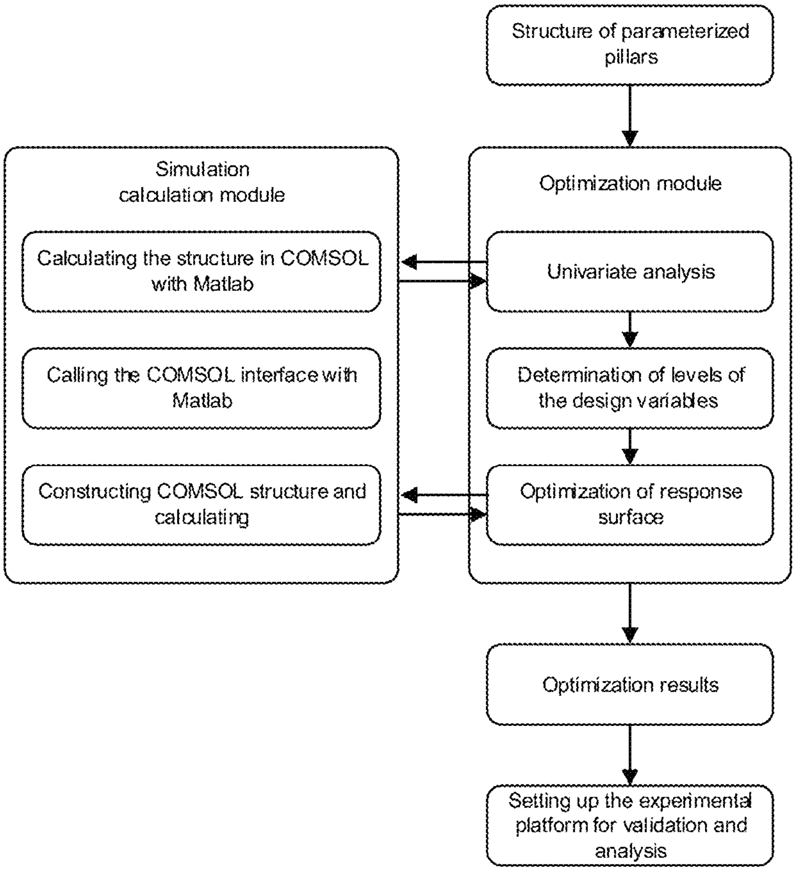
FIG. 4 is a flow chart illustrating an optimization design of the structure parameters for a plurality of pillars.

As shown in FIG. 4, the univariate analysis and the response surface optimization in the optimization module need to call a simulation computation module. Regardless the univariate analysis or the response surface optimization, the temperature rise ΔTj and the pressure drop ΔPf corresponding to different parameters need to be calculated. The temperature rise ΔTj is a difference between a temperature of the cooling liquid 6 flowing through the liquid inlet 401 and a temperature of the power chip 101 in the vehicle power module, and the pressure drop ΔPf is a difference between a pressure of the cooling liquid 6 flowing through the liquid inlet 401 and a pressure of the cooling liquid 6 flowing through the liquid outlet 402. In an embodiment according to this disclosure, the simulation calculation module is implemented by Finite Element Simulation. The finite element simulation uses the method of mathematical approximation to simulate a real physical system and considers the solution domain as consisting of many small, interconnected subdomains called finite elements, assumes a suitable approximate solution for each element, and then deduces the total conditions of satisfaction for solving this domain, thereby obtaining a solution to the problem. The finite element simulation has high accuracy. In an embodiment of this disclosure, the stability of the design results could be improved by performing simulation calculations through finite element simulation.

Simulation Calculation Module

In an embodiment according to this disclosure, finite element simulation calculation is performed using the COMSOL Multiphysics software. In the COMSOL Multiphysics software, finite element calculation models corresponding to equations (1) to (10) are selected for the finite element simulation calculation.

In an embodiment according to this disclosure, the simulation settings are as follows: the temperature of the cooling liquid at the liquid inlet is set to be 65° C. and the flow rate of the cooling liquid at the liquid inlet is set to be 1 m/s. The regions of the power chip 101 and the diode chip 102 in the vehicle power module are provided as heat sources with power of 400 W and 100 W, respectively. An equivalent thin thermal resistance layer is set between the heat dissipation substrate 300 and the plurality of pillars 301, the thickness of the equivalent thin thermal resistance layer is set to be 0.25 mm, the thermal conductivity coefficient of the equivalent thin thermal resistance layer is 6.5 W/(m·K), which is the same as that of the thermal conductive interface material, in other words, the equivalent thin thermal resistance layer is set to be silicone grease.

The purpose of providing silicone grease between the heat dissipation substrate 300 and the plurality of pillars 301 is to correspond to the actual situation in the subsequent verification experiments. Directly manufacturing the heat dissipation substrate 300 with a plurality of pillars 301 requires soldering the plurality of pillars 301 on the heat dissipation substrate 300, which is difficult. Therefore, in the design method according to this disclosure, the plurality of pillars 301 are connected to the heat dissipation substrate 300 using silicone grease. That is, a silicone grease layer, i.e., a thin thermal resistance layer, is added between the plurality of pillars 301 and the heat dissipation substrate 300. Therefore, the silicone grease layer between the plurality of pillars 301 and the heat dissipation substrate 300 needs to be taken into consideration when performing the simulation calculations.

It should be noted that the case of eliminating the thermal resistance corresponding to this silicone grease layer has the same result as soldering the plurality of pillars 301 on the heat dissipation substrate 300. In other words, the simulation or experiment is carried out under the condition that the silicone grease layer is added, and it has the same optimization effect when applying the obtained optimization results to the case without adding the silicone grease layer.

The settings of the simulation materials of the radiator are closely related to the actual materials of the radiator to be optimized. In an embodiment according to this disclosure, according to the vehicle power module of the Infineon Corporation to be optimized, the material of the DBC 200 is copper, the material of the power chip 101 and the diode chip 102 is silicon, the material of the heat dissipation substrate 300 and the plurality of pillars 301 is aluminum alloys, the thermal conductive interface material (i.e., the material of the equivalent thin thermal resistance layer between the heat dissipation substrate 300 and the plurality of pillars 301) is silicone grease, the cooling liquid 6 is a ethanol solution with a volume fraction of 50%, and the settings of the specific material properties are as shown in Table 1.

TABLE 1

The simulation material properties of the radiator

| Material | Density(kg/m$^3$) | Heat capacity at constant voltage [J/(kg · K)] | Thermal conductivity coefficient [W/(m · K)] | Kinetic viscosity (mPa · s) |
|---|---|---|---|---|
| Silicon | 2329 | 700 | 131 | — |
| Copper | 8960 | 385 | 400 | — |
| Aluminum | 2692 | 1063 | 162 | — |
| Silicone grease | 2600 | 1200 | 6.5 | — |
| Cooling liquid | 1048 | 3454 | 0.406 | 1.29 |

Figure 5:
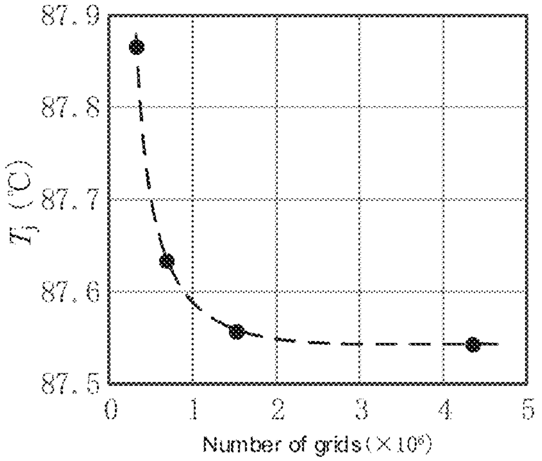
FIG. 5 shows simulation calculation results at different grid densities when performing finite element simulation calculations using COMSOL Multiphysics software.

After the settings of the model is completed, the grids independence analysis is performed. The number of grids is gradually increased to obtain simulation results as shown in FIG. 5. The results show that when the number of grids is increased to $1.5\times10^6$, the effect of the grids on the results is less than 0.02° C., and the effect of the grids on the simulation results is excluded, so that the grid size of each region is finally determined as shown in Table 2. Table 2 shows the grid settings of each region. For the grid settings between the regions, the number of layers in the boundary layer of the region where the fluid domain contacts the radiator is set to be 5, the tensile factor is set to be 1.2, the minimum included angle in the angle refinement is 240°, and the scale factor is 0.35.

TABLE 2

| Grid settings of simulation | | | | | |
|---|---|---|---|---|---|
| Grid area | Maximum element | Minimum element | Growth rate | Curvature factor | Resolution ratio of narrow region |
| Power module | 10 | 4.4 | 1.7 | 0.8 | 0.3 |
| Radiator | 4.15 | 1.28 | 1.25 | 0.8 | 0.5 |
| Fluid domain | 3.19 | 0.958 | 1.2 | 0.7 | 0.6 |

Univariate Impact Analysis

Before establishing the response surface model, a univariate impact analysis needs to be performed on the optimization object first to obtain the main factors affecting the target variables, and the test range of the variables in the response surface is determined.

According to the pillar design of the vehicle power module from Infineon Company, the initial parameters of the plurality of pillars 301 are identified as: H=8 mm, D1=4 mm, D2=3.6 mm, $R_{per}$=62.5%. Based on these, the parameter ranges of the univariate test are determined: 2 mm≤H≤10 mm, 2 mm≤D1≤6 mm, 2 mm≤D2≤6 mm, 40%≤$R_{per}$≤90%. Since the established parameter values of the existing product are closer to the optimal state, in an embodiment of this disclosure, starting from the existing product for analysis could quickly obtain the analysis results and reduce the design cycle.

Figure 6A:
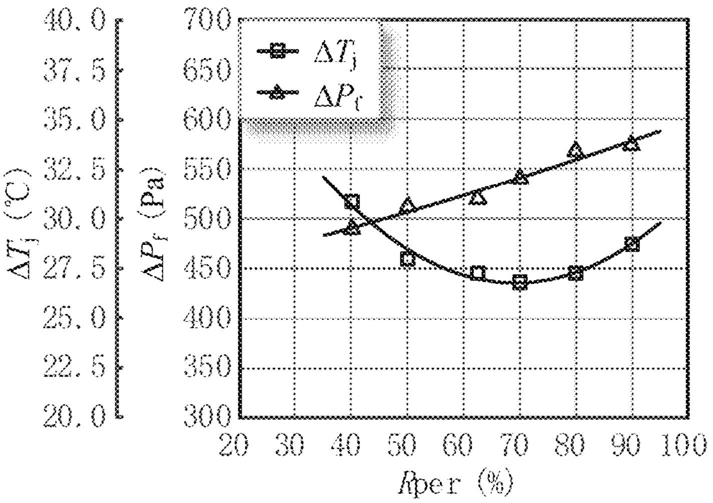
Figure 6B:
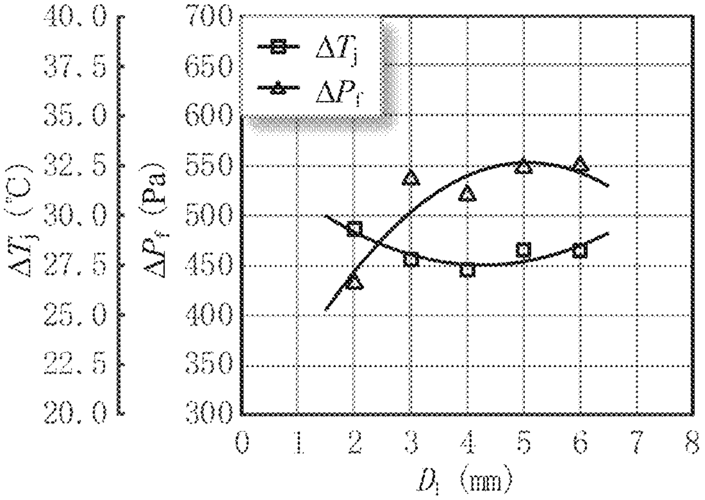
Figure 6C:
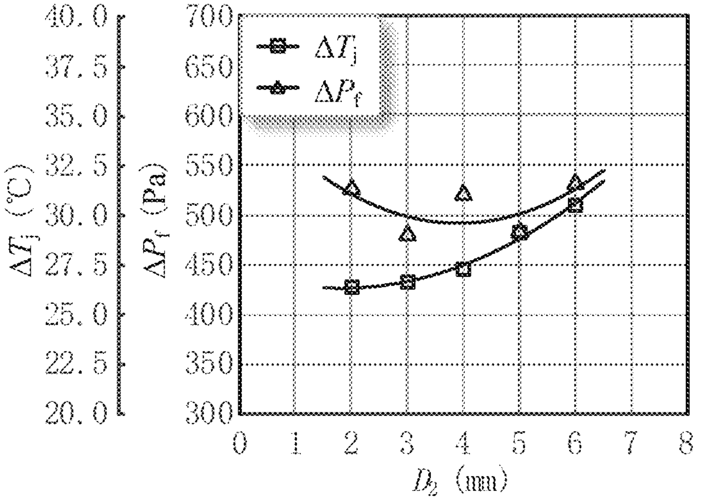
Figure 6D:
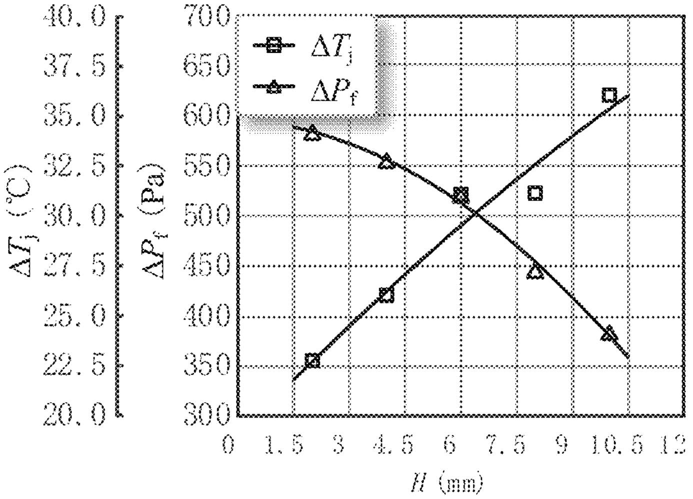

The properties of the radiator with a plurality of pillars integrated therein are calculated by changing the value of only one variable within the specific range of this variable at a time based on the given parameters of the pillars, and the results are shown in FIGS. 6*a* to 6*d*, wherein FIG. 6*a* shows the effect of $R_{per}$; FIG. 6*b* shows the effect of D1; FIG. 6*c* shows the effect of D2; FIG. 6*d* shows the effect of H.

As shown in FIG. 6*a*, increasing the radius of the pillars 301 could reduce the thermal resistance of the radiator, and could reduce the temperature rise of the chip while increasing the pressure drop linearly. However, when the radius is increased to a certain degree, the dense pillars reduce the fluidity of the cooling liquid and the heat exchange space between the pillars 301 and the cooling liquid 6, and the thermal resistance of the radiator is increased instead.

As shown in FIG. 6*b*, the thermal resistance of the radiator could be reduced with increasing D1. However, when D1 is greater than 4 mm, the effect begins to slow down, and after D1 increases to 6 mm, the thermal resistance increases instead. Meanwhile, the pressure drop presents exactly the opposite trend as D1 changes.

As shown in FIG. 6*c*, regarding the effect of D2, the thermal resistance within the design range increases with increasing D2, while the pressure drop decreases first and then increases with increasing D2.

As shown in FIG. 6*d*, increasing the height H of the pillars 301 could increase the heat exchange area of the pillars 301, and could effectively reduce the thermal resistance of the radiator. According to the results of the univariate analysis, H is negatively correlated to the thermal resistance, and the cooling liquid 6 flows in the direction perpendicular to the pillars 301, and H has less interaction with other variables. Therefore, according to the feasible range of the optimization design, the maximum value of H is determined to be 8 mm.

Further, the thermal resistance and the pressure drop have extremums when D1 is near 4 mm, and 3 mm to 5 mm is taken as the optimization design range. Regarding D2, 2 mm to 4 mm is taken as the optimization design range in consideration of the manufacturing process and structural stability of the pillars 301. Considering that the pressure drop has an extremum when the $R_{per}$ is near 70%, 60% to 80% is taken as the optimization design range of the $R_{per}$.

So far, the parameters to be designed and the possible value ranges thereof have been determined according to the results of the univariate impact analysis. Specifically, the height H is negatively correlated to the thermal resistance, so that the maximum possible value of H is taken directly; and the possible value ranges of the first distance D1, the second distance D2 and the radius ratio $R_{per}$ are determined based on the extremum states of the thermal resistance and the pressure drop. Since the structural parameters when the thermal resistance and the pressure drop are extremums are closer to the optimal state (i.e. ideal parameters to be solved), the possible value ranges of the parameters are determined according to the extremum states, the accuracy of the parameters and the value ranges thereof could be improved, and useless calculations are reduced.

In conclusion, with $\Delta T_j$ and $\Delta P_f$ as response values, the structural parameters D1, D2, and $R_{per}$ of the pillars 301 as response factors, a response surface of three factors at three levels (A, B and C) is designed to optimize the radiator structure of the vehicle power module. The factors and levels are shown in Table 3. It can be seen from Table 3 that the specific values of the first distance D1, the second distance D2, and the radius ratio $R_{per}$ are all selected from the possible value ranges determined according to extremum states of the thermal resistance and the pressure drop, which could ensure that the subsequent calculations are performed near ideal values, could further improve the accuracy of the parameters and the value ranges thereof, and reduce useless calculations.

TABLE 3

| Factor-level results for the response surface design | | | |
|---|---|---|---|
| | Level | | |
| Factor | A (−1) | B (0) | C (1) |
| $D_1$ (mm) | 3 | 4 | 5 |
| $D_2$ (mm) | 2 | 3 | 4 |
| $R_{per}$ (%) | 60 | 70 | 80 |

Central Composite Response Surface Design

Commonly used response surface designs are the Box-Behnken design and the central composite design. Where the central composite design is a factorial or fractional factorial design that includes central points and are augmented with a group of axial points (also called star points) that could be used to estimate curvature. Compared with the Box-Behnken design, the central composite design has slightly increased number of tests, but has higher design precision with due consideration given to the condition of limit design values. Therefore, this disclosure uses the central composite design method to build the response surface.

The experimental design results are shown in Table 4. The experimental results are obtained by the finite element simulation implemented through the COMSOL Multiphysics software, the number of the central points is set to be 1.

TABLE 4

| Simulation results of the central composite design | | | | | |
|---|---|---|---|---|---|
| Number | D1 (mm) | $D_2$ (mm) | $R_{per}$ (%) | $\Delta T_j$ (° C.) | $\Delta P_f$ (Pa) |
| 1 | 3 | 2 | 60 | 26.70 | 565.2 |
| 2 | 5 | 2 | 60 | 26.36 | 647.9 |
| 3 | 3 | 4 | 60 | 28.92 | 490.0 |
| 4 | 5 | 4 | 60 | 28.28 | 741.1 |
| 5 | 3 | 2 | 80 | 27.45 | 584.7 |
| 6 | 5 | 2 | 80 | 26.83 | 688.0 |
| 7 | 3 | 4 | 80 | 27.02 | 533.5 |
| 8 | 5 | 4 | 80 | 27.10 | 799.6 |
| 9 | 5 | 3 | 70 | 26.11 | 677.1 |
| 10 | 5 | 3 | 70 | 27.16 | 628.5 |
| 11 | 4 | 2 | 70 | 25.93 | 561.7 |
| 12 | 4 | 4 | 70 | 27.37 | 511.7 |
| 13 | 4 | 3 | 60 | 26.91 | 521.8 |
| 14 | 5 | 4 | 70 | 27.04 | 470.7 |
| 15 | 5 | 4 | 80 | 26.73 | 476.3 |

Fitting of Response Surface Model

According to the results of the response surface of the central composite design in Table 4, a surface model between $\Delta T_j$ and $\Delta P_f$ and the dimension of the pillars 301 is constructed using the explicit functions. When constructing the response surface model, the kinetics behavior of the radiator with a plurality of pillars integrated therein should be described using a model as simple as possible while ensuring the fitting accuracy and prediction precision.

There are mainly 3 commonly used models. Two factor interactive (2FI) model could be expressed as:

$$\hat{y} = \sum_{i=1}^{n} \beta_{ii} x_i + \sum_{i<j}^{n-1} \sum_{j \neq i}^{n} \beta_{ij} x_i x_j \tag{12}$$

Where $\hat{y}$ is the estimated value of the model, $X_i$ is the variable factor to consider, n is the number of the variables to consider, and $\beta_{ij}$ is the coupling coefficient among variables.

The Quadratic model is expressed as:

$$\hat{y} = \sum_{i=1}^{n} \beta_i x_i + \sum_{i<j}^{n-1} \sum_{j}^{n} \beta_{ij} x_i x_j \tag{13}$$

The Cubic model is expressed as:

$$\hat{y} = \sum_{i=1}^{n} \beta_i x_i + \sum_{i<j}^{n-1} \sum_{j}^{n} \beta_{ij} x_i x_j + \sum_{i<j}^{n-2} \sum_{j<k}^{n-1} \sum_{k}^{n} \beta_{ijk} x_i x_j x_k \tag{14}$$

The data in Table 4 is fitted using 2FI, Quadratic and Cubic models, respectively, and the results of the variance analysis are shown in Table 5. The higher the variance value is, the better the fitting effect of the model is.

TABLE 5

| Model fitting results of the response surface | | | | |
|---|---|---|---|---|
| Response value | Model | Test variance | Adjusted variance | Forecast variance |
| $\Delta T_j$ | 2PI | 0.5819 | 0.4200 | 9.7675 |
| | Quadratic | 0.7318 | 0.6010 | 10.8750 |
| | Cubic | 0.7788 | 0.6473 | 11.8307 |

TABLE 5-continued

| Model fitting results of the response surface | | | | |
|---|---|---|---|---|
| Response value | Model | Test variance | Adjusted variance | Forecast variance |
| $\Delta P_f$ | 2PI | 0.2499 | 0.0826 | 4.1221 |
| | Quadratic | 0.7225 | 0.6208 | 8.5635 |
| | Cubic | 0.9187 | 0.8795 | 16.5090 |

According to Table 5, since each variance value with the Cubic model is the highest, the Cubic model has good fitting effect on the response surface. Therefore, a response surface equation of the response values and the coded values in Table 1 could be obtained $$\begin{cases} \Delta T_j = 26.66 + 0.54B - 0.54BC + \\ \quad 0.6C^2 - 0.23A^2C \\ \Delta P_f = 508.4 - 24.3A + 41.4AB + \\ 127.1A^2 + 20.2A^2C + 112.2AB^2 \end{cases} \tag{15}$$

By converting into the structural parameters of the pillars, the response surface equation shown in equation (15) is rewritten as:

$$\begin{cases} \Delta T_j = 26.66 + 0.54(D_2 - 3) - 0.54(D_2 - 3) \\ (10R_{per} - 7) + 0.6(10R_{per} - 7)^2 - 0.23(D_1 - 4)^2(10R_{per} - 7) \\ \Delta P_f = 508.4 - 24.3(D_1 - 4) + 41.4D_1(D_2 - 3) + 127.1 \\ (D_1 - 4)^2 + 20.2(D_1 - 4)^2(10R_{per} - 7) + 112.2(D_1 - 4)(D_2 - 3)^2 \end{cases} \tag{16}$$

Figure 7A:
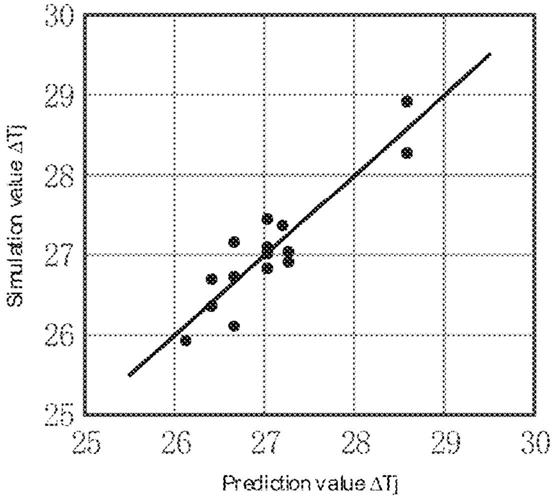
FIGS. 7*a* and 7*b* are diagrams of a comparison between model fitting results and finite element simulation calculation results according to an embodiment of this disclosure, where
Figure 7B:
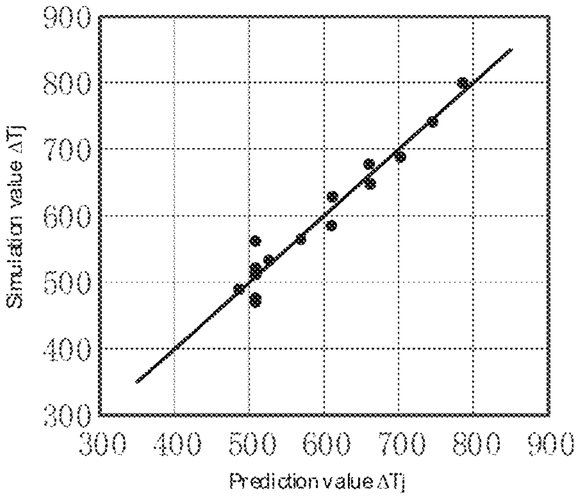

The predicted values of the model fitting are compared to the simulation values of the finite elements, as shown in FIGS. 7*a* and 7*b*. In FIGS. 7*a* and 7*b*, the abscissa value corresponding to the numerical points represents the predicted values obtained according to the response surface equations, and the ordinate value corresponding to the numerical points represents the simulation values of the finite elements. Therefore, the simulation results and the model results are in good agreement, and the selected fitting model could well characterize the basic information of the response surface.

Figure 8A:
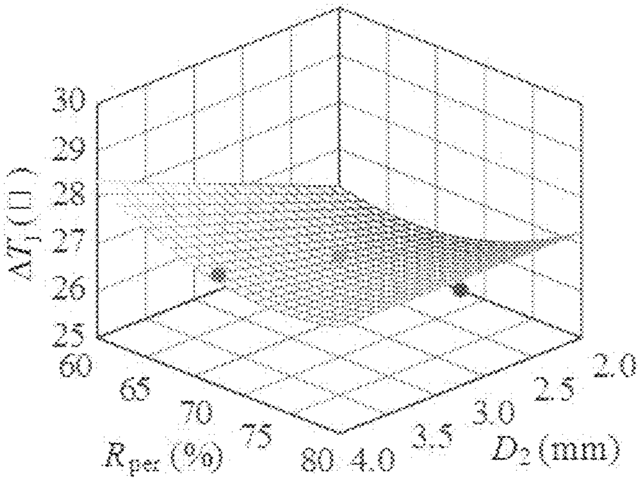
Figure 8B:
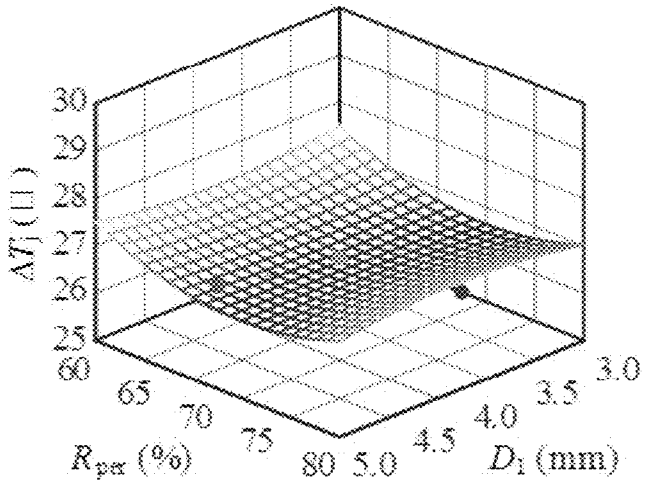
Figure 8C:
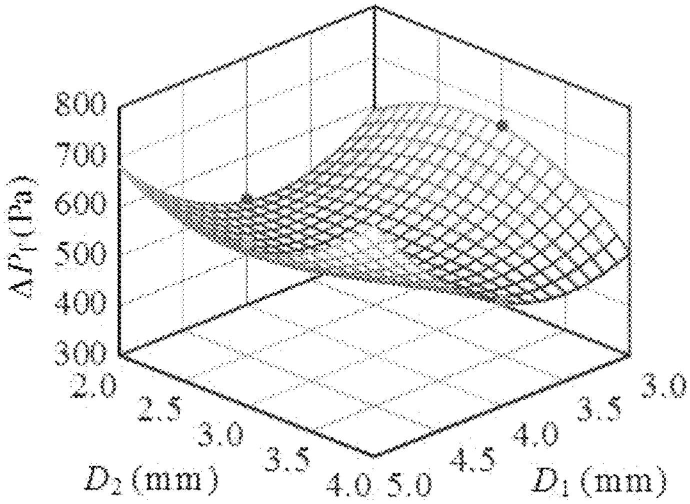
Figure 8D:
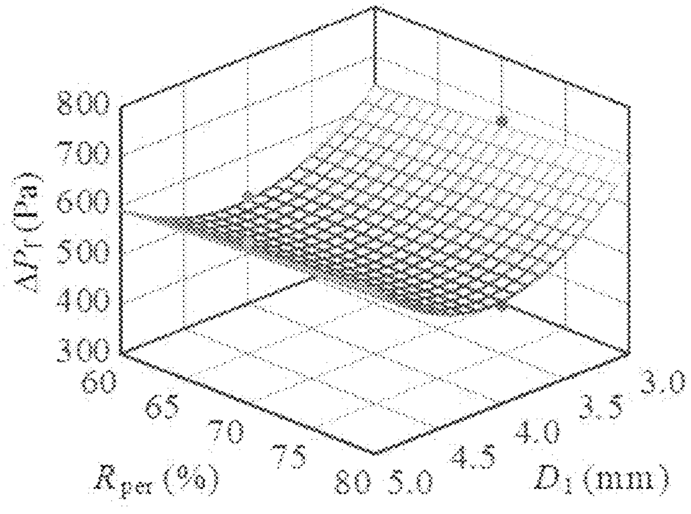

The simulation results of the central composite design, and the fitting results of the response surface are shown in FIGS. 8*a* to 8*d*, wherein FIG. 8*a* shows the functional relationship between the pressure drop and D2 and D1. FIG. 8*b* shows the functional relationship between the pressure drop and $R_{per}$ and D1. FIG. 8*c* shows the functional relationship between the pressure drop and D2 and D1. FIG. 8*d* shows the functional relationship between the pressure drop and $R_{per}$ and D1. Therefore, different response surfaces are close to a saddle shape, the design of each parameter and the selection of the parameter range in the experimental design are reasonable. As the radius ratio $R_{per}$ of the pillars 301 increases, the temperature rise of the chip increases first and then decreases, and changes greatly, while the pressure drop of the cooling liquid 6 slightly increases, but changes little. As the first distance D1 increases, the pressure drop decreases first and then increases, the temperature rise increases continuously, and D1 is more sensitive to the pressure drop and has less effect on the temperature. As the second distance D2 increases, the temperature increases continuously, while the interaction between D2 and D1 has a greater effect on the pressure drop of the cooling liquid 6.

Optimization Design Results

The response surface model establishes an explicit mathematical description between the structural parameters of the pillars 301 and the radiator properties, thus optimization design results of the pillars 301 could be obtained. With an optimization objective that the temperature rise ΔTj and the pressure drop ΔPf are simultaneously minimized, the multi-objective optimization problem is obtained.

$$\min\begin{cases} \Delta T_j = f_1(D_1, D_2, R_{per}) \\ \Delta P_f = f_2(D_1, D_2, R_{per}) \end{cases} \tag{17}$$

$$st.\begin{cases} 3\text{ mm} \le D_1 \le 5\text{ mm} \\ 2\text{ mm} \le D_2 \le 4\text{ mm} \\ 0.6 \le R_{per} \le 0.8 \end{cases}$$

Figure 9:
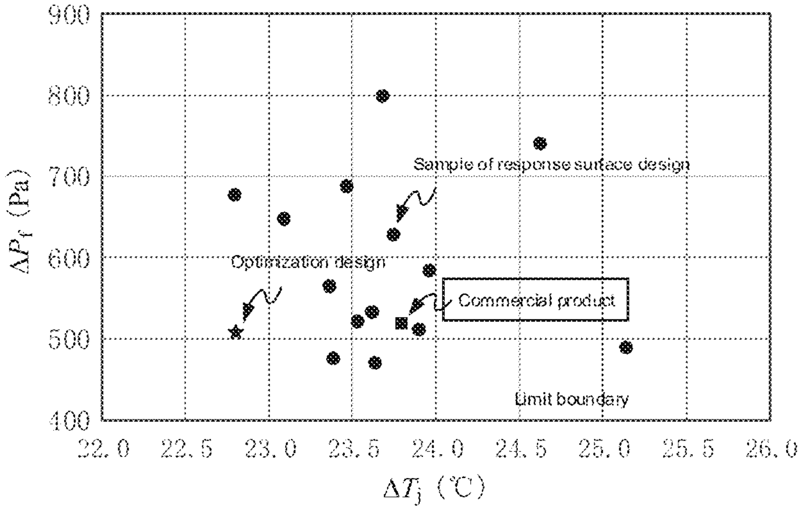
FIG. 9 is a diagram of a comparison among a conventional design, an optimization design and a plurality of samples according to an embodiment of this disclosure.

The optimal pillar structure parameters are obtained by using a nonlinear multi-objective optimization method: $D_1$=3.82 mm, $D_2$=2 mm, $R_{per}$=65.5%. As shown in FIG. 9, according to the response surface model, the temperature rise and the pressure drop at this time are 26.00° C. and 502.9 Pa, respectively, and the junction to flow thermal resistance of the optimized radiator with a plurality of pillars integrated therein is 65 K/kW for the power chip 101. With regard to the package power module HybridPack for a vehicle of Infineon Corporation, the temperature rise and the pressure drop are 27.56° C. and 532.43 Pa respectively, and the junction to flow thermal resistance of the power chip 101 is 68.9 K/kW. Therefore, the thermal resistance could be further reduced by 5.67% and the pressure drop of the cooling liquid could be further reduced by 3.3% with the design method of this disclosure, relative to the existing commercial products.

The finite element simulation software is used to further validate the feasibility of the optimization design results. In other words, the conventional parameters and the parameters optimized by the design method according to this disclosure are respectively input into the finite element simulation software for simulation calculations. The results show that: the thermal resistance and the pressure drop of the conventional radiator are 68.21 K/kW and 520 Pa, and the errors between the simulation results and the model prediction results are −0.79 K/kW and −12.43 Pa respectively. The thermal resistance and the pressure drop of the optimized radiator are 64.99 K/kW and 568.6 Pa respectively, and the errors between the simulation results and the model prediction results are −0.01 K/kW and 65.7 Pa respectively. As can be seen from comparison between the simulation results and the prediction results, the response surface method used in this disclosure could obtain better results, and could effectively obtain the optimal design parameters of the pillars 301.

Figure 10:
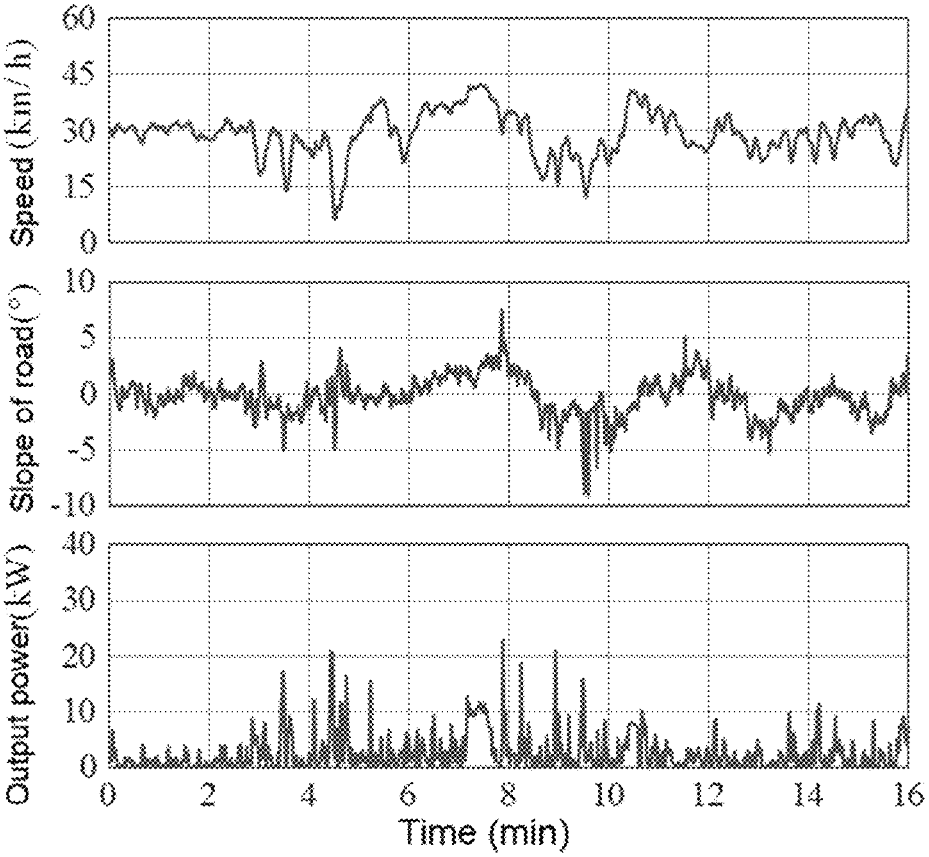
FIG. 10 shows actual working conditions data for a particular trip of a passenger vehicle.

Using a passenger vehicle for example, the actual working conditions are used to evaluate the true properties of the optimized parameters, and the actual working conditions data of a trip is shown in FIG. 10, which includes the speed, the gradient and the output power, etc.

The distribution condition of the junction temperature of the chip is obtained through transient simulation, the dissipation of the power chip 101 and the diode chip 102 are set through simulation and calculated according to the data manual. The ON-loss of the power chip 101 could be expressed as:

$$P_{Icond} = V_{ce} I_c \tag{18}$$

Where $V_{ce}$ and $I_c$ are the saturation voltage drop and the collector current of the power chip 101, respectively. The switching loss of the power chip 101 could be expressed as:

$$P_{Isw} = (E_{on} + E_{off}) f_s \frac{V_{dc} I_c}{V_{dcn} I_{cn}} \tag{19}$$

Where $E_{on}$ and $E_{off}$ are the turn-on loss and turn-off loss of the power chip 101, $f_s$ is the switching frequency, $V_{dc}$ is DC bus voltage, $V_{dcn}$ and $I_{cn}$ are the DC bus voltage and the collector current respectively used for the turn-on and turn-off loss test in the data manual. The ON-loss of the diode chip 102 could be expressed as:

$$P_{Dcond} = V_d I_d \tag{20}$$

Where $V_d$ and $I_d$ are the ON-voltage drop and the ON-current of the diode chip 102, respectively. The switching loss of the diode chip 102 is mainly reverse recovery loss, which could be expressed as:

$$P_{Dsw} = E_{rec} f_s \frac{V_{dc} I_d}{V_{dcn} I_{dn}} \tag{21}$$

Where $E_{rec}$ is the reverse recovery loss of the diode chip 102, and $I_{dn}$ is the ON-current used in the reverse recovery loss test of the diode chip 102 in the data manual. The calculation results are substituted into COMSOL in a table look-up manner for calculation, wherein the transient simulation time is 1000 s, and the transient data is output every 0.5 s.

The measured experimental data obtained under the condition of maximum power loss shows that: through optimization, the highest junction temperature of the chip could be reduced by 10° C., and the reliability of the power module is improved.

Experimental Validation and Result Analysis

1. Experiment Platform

Figure 11:
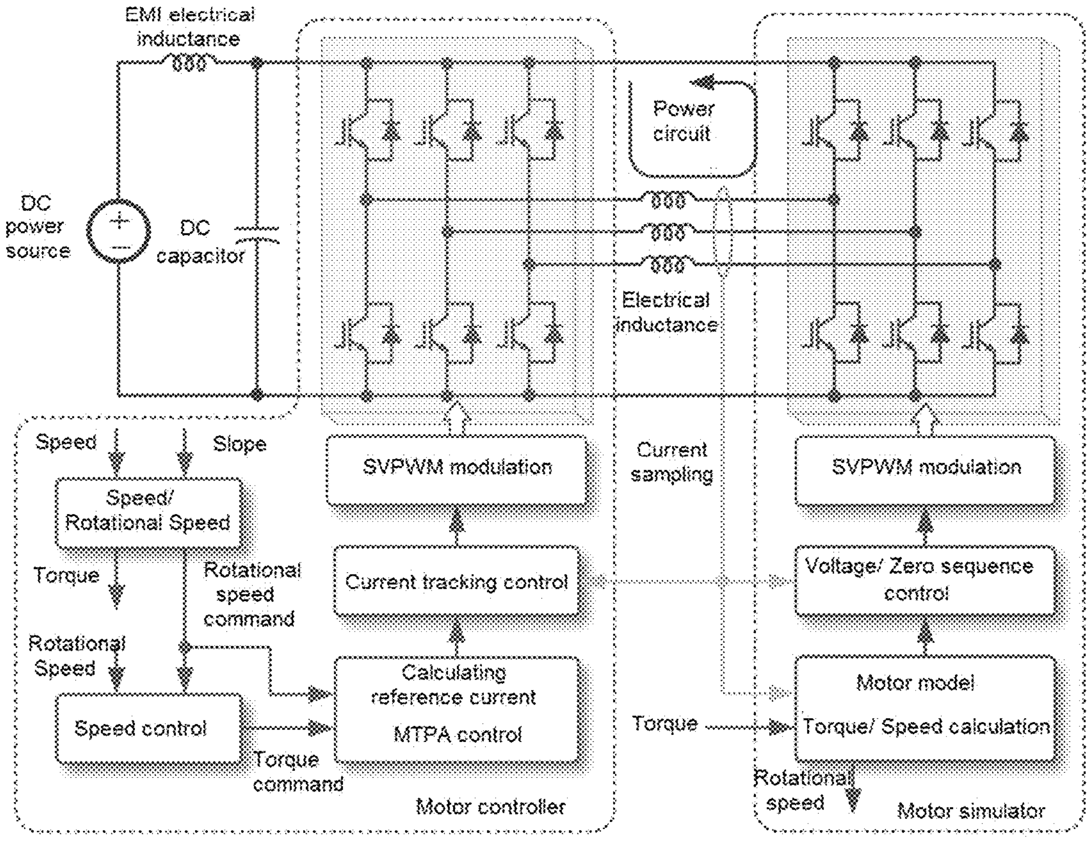
FIG. 11 is a schematic block diagram of a mechanical back-to-back experimental platform for face-to-face converters.

In order to simulate the operation conditions of the vehicle motor controller, a mechanical back-to-back experimental platform for face-to-face converters as shown in FIG. 11 is set up. One three-phase bridge is used as a module under test to simulate the motor controller, and the other three-phase bridge is used to simulate the motor. The motor controller is connected to the motor simulator through an inductor. The DC power supply and the DC capacitor are used to simulate the battery voltage. The DC power supply only needs to provide the loss of two inverters because the power only flows between the two inverters, so that there is little demand for the power, and it is easy to realize high-power load.

In order to validate the design effect based on the response surface optimization described above, directed to the package power module HybridPack of the Infineon Company, model machines of a conventional radiator and an optimized radiator and converter model machines formed by the power module are developed using an aluminum alloy material based on a metal 3D printing technology.

2. Radiator Property Test Under Fixed Working Conditions

When the peak value of the alternating current phase current of the fixed inverter is 136 A and the cooling liquid flow is 2.62 L/min, the DC bus voltage of the inverter is controlled, and the properties of different radiators are compared. Therefore, the higher the DC bus voltage is, the higher the output power of the inverter is, and the higher the loss of the power chip is, the higher the junction temperature is. Under such test conditions, when the bus voltages are equal, the junction temperature of the chip when using the optimized radiator could be reduced by 5° C. to 10° C. compared with the conventional radiator.

When the DC bus voltage of the fixed converter is 350V and the cooling liquid flow is 2.62 L/min, the peak value of the AC phase current of the converter is altered, and the maximum junction temperature of the power chip 101 when using the conventional radiator is compared with that of the power chip 101 when using the optimized radiator. Therefore, when the DC bus voltage is constant, the larger the output current of the inverter is, the higher the loss of the power chip and the higher the junction temperature is. Compared with the conventional pillars, the optimized pillars 301 could reduce the junction temperature of the chip by 5° C. to 10° C.

Figure 12A:
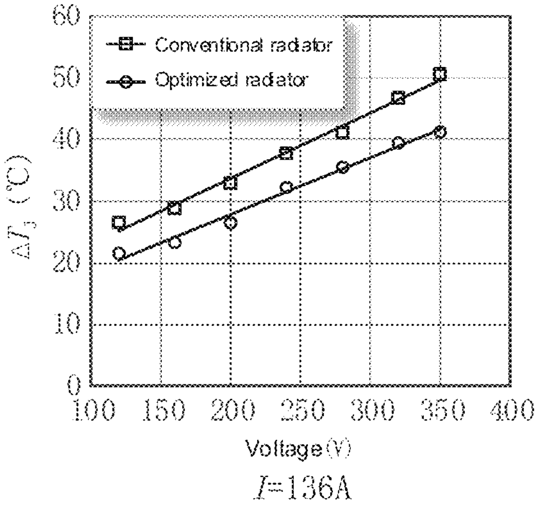
Figure 12B:
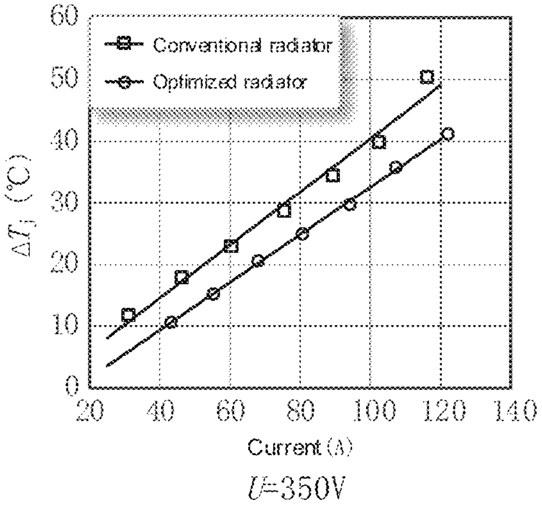

Considering the effect of the DC voltage and the load current, the temperature rise of the chip is shown in FIGS. 12*a* and 12*b*, wherein FIG. 12*a* shows the change of the temperature rise with the DC voltage; FIG. 12*b* shows the change of the temperature rise with the load current. As shown in FIGS. 12*a* and 12*b*, the temperature rise of the chip is linearly related to the current and voltage stress, and use of the optimized radiator could effectively reduce the junction temperature of the chip and improve the electricity-heat stress of the chip.

When the fixed DC bus voltage is 350V and the peak value of the AC side phase current is 90 A, the cooling liquid flow of the inverter is controlled, and the properties of different radiators are compared. Therefore, the larger the cooling liquid flow, the stronger the heat exchange capability of the radiator, the smaller the junction to flow thermal resistance of the chip and the lower the junction temperature of the chip. Compared with the conventional radiator, the optimized radiator could effectively reduce the junction temperature of the chip.

Figure 13A:
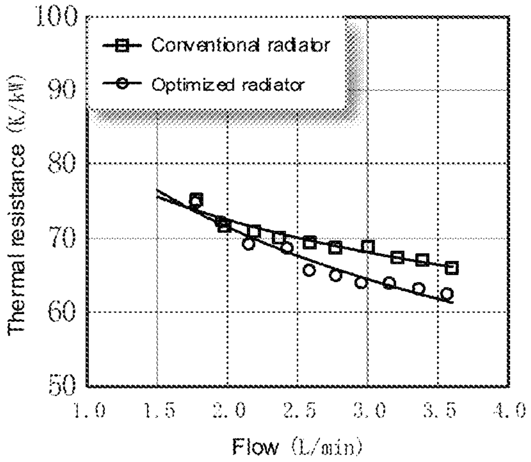

According to the data manual of the power module FS400R07A3E3, when the switching frequency of the power chip 101 is 10 kHz, the DC side voltage is 350V, and the peak value of the AC side phase current is 90 A, the power loss of the power chip 101 and the diode chip 102 could be calculated, and finally the total thermal power of the power module at this time could be calculated as 565 W, wherein the loss of the power chip 101 is 392 W and the loss of the diode chip 102 is 173 W. According to the temperature rise of the chip, the junction to flow thermal resistance of the chip could be calculated: $R_{thjf}=\Delta T_j/P_{loss}$, as shown in FIG. 13*a*. Based on a least square fitting method, the mathematical description of the thermal resistance and flow could be constructed, with regard to the initially designed radiator: $R_{th}=-15.63 \ln Q+86.47$ K/kW, with regard to the radiator after optimization design: $R_{th}=-25.01 \ln Q+91.54$ K/kW. When the flow is Q=3.01 L/min, the thermal resistance of the unoptimized radiator is 69.25 K/kW, while the thermal resistance of the optimized radiator is 63.97 K/kW, and the steady-state junction to flow thermal resistance is reduced by 7.62%. The feasibility and effectiveness of the pillar design method based on the response surface optimization are validated.

Figure 13B:
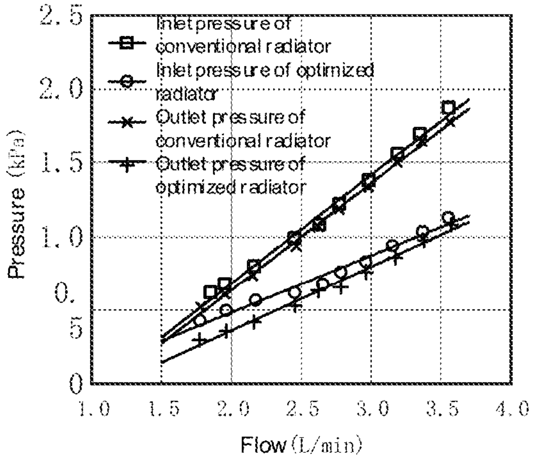

Furthermore, the hydraulic pressures at the water inlet and water outlet of the radiator at different flows are calculated as shown in FIG. 13*b*, the mathematical description of the radiator pressures with respect to the flows could be obtained by linear function fitting:

$$\begin{cases} P_{in1} = 732.73Q - 779.94 \\ P_{out1} = 385.98Q - 285.12 \end{cases} \tag{22}$$

$$\begin{cases} P_{in2} = 722.66Q - 805.46 \\ P_{out2} = 432.12Q - 500.32 \end{cases} \tag{23}$$

Where Q is the flow with the unit of l/min, $P_{int}$ and $P_{out1}$ are the hydraulic pressures at the water inlet and the water outlet of the conventional radiator, respectively, $P_{in2}$ and $P_{out2}$ are the hydraulic pressures at the water inlet and the water outlet of the optimized radiator, respectively. When Q=3.01 L/min, the pressure drop of the conventional radiator with a plurality of pillars integrated therein and that of the optimized radiator with a plurality of pillars integrated therein are calculated as 548.9 Pa and 569.4 Pa, respectively.

As shown in FIGS. 13*a* and 13*b*, the pressure drop of the optimized radiator is slightly larger than that of the conventional radiator at low flow, and the difference between their pressure drops decreases and tends to be stable as the flow increases. In combination with the thermal resistance properties of different radiators as shown in FIGS. 12*a* and 12*b* when using the constant-power water pump, it can be seen that when the constant-power water pump is used to drive the cooling liquid, the thermal resistance of the optimized radiator is significantly lower than that of the conventional radiator, the result shows that: when the flow rate is medium or low, the effect of the pressure drop on the thermal resistance is small, and use of the response surface method to optimize the structure of the pillars could effectively reduce the thermal resistance of the radiator.

3. Property Tests Under Actual Working Conditions

According to the test circuit of FIG. 11, the electricity-heat property of the motor controller for the vehicle, the output voltage and the current waveform of the inverter are evaluated. An infrared camera is used to observe the chip junction temperature of the power module in real time. The power chip 101 has the highest junction temperature at the center of the power module, under the whole working conditions, before and after optimization, the average junction temperatures of the chip are 78.2° C. and 76.3° C. (the average temperature rise of the chip is 13.2° C. and 11.3° C.), and the highest junction temperatures are 115.9° C. and 105.9° C., respectively (the maximum temperature rise of the chip is 50.9° C. and 40.9° C.). In addition, the experimental results and the simulation results are in agreement substantially, the average errors between the experimental results and the simulation results before and after optimization are 2.2% and 1.7%, respectively, and the maximum errors are 10.8% and 9.8%, respectively. The experiments demonstrate that by using the optimized pillars, the average temperature rise of the chip is reduced by 14%, the maximum temperature rise of the chip is reduced by 20%, which could effectively reduce the electricity-heat stress of the power module, and improve the desired service life of the vehicle motor controller and the electric vehicle.

4. Evaluation of the Effect of the Pillar Optimization on Power Module Life

Based on the Coffin-Manson model, a service life model of the vehicle power module could be established by using the Power Cycling Accelerated Aging experimental method, which is expressed as:

$$N_f(DT_j, T_{jm}) = a(DT_j)^{-n} e^{E_a/[k_b(T_{jm}+273)]} \tag{24}$$

Where $N_f$ is the service life of the power module, $\Delta T_j = T_{jmax} - T_{jmin}$ is the amplitude of the junction temperature fluctuation, $T_{jm} = (T_{jmax} + T_{jmin})/2$ is the average value of the junction temperature fluctuation, respectively, $T_{jmax}$ and $T_{jmin}$, are maximum and minimum values of the junction temperature fluctuation, respectively, $k_b = 1.38 \times 10^{-23}$ J/K is a boltzmann constant, a and n are constants related to the power module package, and $E_a$ is the activation energy. For the vehicle power module of the HybridPack package, according to the experimental results, model parameters could be obtained: $a = 8.64 \times 10^8$, $n = 5.79$, $E_a = 0.46$ eV.

Based on the accumulated fatigue damage theory, according to the load results of the actual working conditions in conjunction with the rain flow counting of real-time junction temperature fluctuation, the damage degree $D_a$ of the power module is expressed as:

$$D_a = \int_0^{T_P} \frac{N_d(T_{jm}, \Delta T_j)}{N_f(T_{jm}, \Delta T_j)} dt \tag{25}$$

Where $T_p$ is the duration of the load, $N_d(T_{jm}, \Delta T_j)$ is the occurrence number of the junction temperature fluctuation $T_{jm}$ and $\Delta T_j$, which is the damage degree of the power module. When the damage degree $D_a$ reaches 100%, the power module fails.

Based on the experimental results, the life consumption of the power module is obtained by using different pillar parameters according to the definition of the damage degree. Therefore, for the actual working conditions of the vehicle, the damage degree of the power module could be reduced by 65% by using the optimized pillars. The predicted service life of the vehicle motor controller of the conventional radiator and that of the optimized radiator are 20 years and 56 years, respectively, and the optimized scheme could improve the service life of the motor controller by 1.8 times.

It should be understood that the above embodiments are merely exemplary embodiments for the purpose of illustrating the principle of this disclosure, and the disclosure is not limited thereto. Various modifications and improvements could be made by a person skilled in the art without departing from the spirit and essence of this disclosure. Accordingly, all of the modifications and improvements also fall into the protection scope of this disclosure.

What is claimed is:

1. A design method for a radiator of a vehicle power module, wherein the radiator comprises:

a heat dissipation substrate having a first surface in proximity to the vehicle power module and a second surface distant from the vehicle power module; and a cooling tank, that is located on a side of the second surface distant from the vehicle power module, wherein the cooling tank is provided with an interface in proximity to the second surface, and the second surface seals the interface, a side wall of the cooling tank is provided with a liquid inlet for an inflow of a cooling liquid and a liquid outlet for an outflow of the cooling liquid, wherein the heat dissipation substrate is provided with a plurality of pillars extending from the second surface, the plurality of pillars extends into the cooling tank through the interface;

wherein the plurality of pillars form a pillar array, the pillar array comprises a plurality of rows, the pillars in a same row are arranged on a same straight line, and a distance between two adjacent pillars in the same row is a first distance D1, the plurality of rows are parallel to each other, a distance between two adjacent rows is a second distance D2, the plurality of pillars are cylindrical and have a radius R, wherein the design method comprises the following steps:

determining possible value ranges of the first distance D1, the second distance D2 and the radius R;

selecting a plurality of specific values from the possible value ranges of the first distance D1, the second distance D2 and the radius R, respectively, to form different combinations of the plurality of specific values, performing simulation calculations on the different combinations, and obtaining a temperature rise ΔTj and a pressure drop ΔPf corresponding to each combination to form a plurality of samples, wherein the temperature rise ΔTj is a difference between a temperature of the cooling liquid flowing through the liquid inlet and a temperature of a chip in the vehicle power module when the simulation calculations are performed for the different combinations, and the pressure drop ΔPf is a difference between a pressure of the cooling liquid flowing through the liquid inlet and a pressure of the cooling liquid flowing through the liquid outlet when the simulation calculations are performed for the different combinations;

fitting explicit functions of the temperature rise ΔTj and the pressure drop ΔPf with the first distance D1, the second distance D2 and the radius R as dependent variables according to the plurality of samples, through a response surface method; and determining the first distance D1, the second distance D2 and the radius R with an optimization objective that the temperature rise ΔTj and the pressure drop ΔPf are simultaneously minimized, through a multi-objective optimization.

2. The design method of claim 1, wherein the radius R is expressed by a radius ratio $R_{per}$, and the relationship between the radius R and the radius ratio $R_{per}$ is:

$$R = R_{per} \times \min\left(\sqrt{D_1^2/4 + D_2^2}/2,\ D_1/2\right),$$

wherein $$\min\left(\sqrt{D_1^2/4 + D_2^2}/2,\ D_1/2\right)$$

expresses a smaller value between $$\sqrt{D_1^2/4 + D_2^2}/2$$

and $D_1/2$.

3. The design method of claim 1, wherein the performing simulation calculations on the different combinations is implemented by finite element simulation.

4. The design method of claim 3, wherein an equivalent thin thermal resistance layer is set between the heat dissipation substrate and the plurality of pillars, the equivalent thin thermal resistance layer has a same thermal conductivity coefficient as that of a thermal conductive interface material.

5. The design method of claim 4, wherein the thermal conductive interface material is set to be silicone grease.

6. The design method of claim 3, wherein the vehicle power module comprises a circuit board and the chip, and wherein the chip is disposed on the circuit board, wherein the circuit board has a material that is set to be copper, a material of the chip is set to be silicon, and a material of the heat dissipation substrate and the plurality of the pillars is set to be an aluminum alloy.

7. The design method of claim 3, wherein the cooling liquid is set to be an ethanol solution with a volume fraction of 50%.

8. The design method of claim 3, wherein the finite element simulation is performed using Multiphysics software, with the number of grids being greater than $1.5\times10^6$.

9. The design method of claim 1, wherein the plurality of pillars have a height H, and wherein the design method further comprises performing univariate impact analysis on the first distance D1, the second distance D2, the radius R, and the height H, respectively.

10. The design method of claim 9, wherein the identifying parameters of the plurality of pillars of any existing radiator product as initial parameters of the first distance D1, the second distance D2, the radius R and the height H, fluctuate by a preset ratio based on the initial parameters to obtain parameter ranges of the first distance D1, the second distance D2, the radius R and the height H when performing the univariate impact analysis; and changing based on the initial parameters, only the value of one variable within the parameter range of this variable each time, and simulation calculations on the temperature rise ΔTj and the pressure drop ΔPf are performed.

11. The design method of claim 10, wherein in the process of performing the univariate impact analysis, values of the first distance D1, the second distance D2, the radius R, and the height H when the temperature rise ΔTj and the pressure drop ΔPf are extremums, are taken as the specific values.

12. The design method of claim 10, wherein in the process of performing the univariate impact analysis, values of the first distance D1, the second distance D2, the radius R, and the height H, which are fluctuated by a preset ratio from values of the first distance D1, the second distance D2, the radius R, and the height H when the temperature rise ΔTj and the pressure drop ΔPf are extremums, are taken as the specific values.

13. The design method of claim 1, wherein the response surface is constructed using a central composite design method.

14. The design method of claim 13, wherein the explicit functions are fitted using a Cubic model.

15. The design method of claim 13, wherein the explicit functions are fitted by using a 2FI model, a Quadratic model and a Cubic model, respectively, variance analyses are performed on fitting results, respectively, and the fitting result with a highest variance value is taken as final explicit functions.

16. The design method of claim 1, wherein the first distance D1, the second distance D2, and the radius R are determined using a nonlinear multi-objective optimization method.

17. A radiator of a vehicle power module, designed according to the design method of claim 1.

18. The radiator of the vehicle power module according to claim 17, wherein the first distance D1 is 3.82 mm, the second distance D2 is 2 mm, and the radius ratio $R_{per}$ is 65.5%.

* * * * *